(12) United States Patent
Shaik et al.

(10) Patent No.: US 10,855,179 B2
(45) Date of Patent: Dec. 1, 2020

(54) FAST CHARGE SHARING BETWEEN CAPACITORS OF A DUAL INPUT PATH DC/DC CONVERTER

(71) Applicant: Apple Inc., Cupertino, CA (US)

(72) Inventors: Khaleel Shaik, Santa Clara, CA (US); Di Zhao, Santa Clara, CA (US); Sivasankari Krishnanji, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 711 days.

(21) Appl. No.: 15/471,042

(22) Filed: Mar. 28, 2017

(65) Prior Publication Data

US 2018/0198368 A1    Jul. 12, 2018

Related U.S. Application Data

(60) Provisional application No. 62/443,160, filed on Jan. 6, 2017.

(51) Int. Cl.
*H02J 7/02* (2016.01)
*H02J 7/35* (2006.01)
*H02M 3/158* (2006.01)
*H02J 7/00* (2006.01)

(52) U.S. Cl.
CPC ........... *H02M 3/158* (2013.01); *H02J 7/00* (2013.01); *H02J 7/35* (2013.01); *H02J 7/025* (2013.01); *H02J 2207/20* (2020.01)

(58) Field of Classification Search
USPC .......................................... 307/82
See application file for complete search history.

(56) References Cited

U.S. PATENT DOCUMENTS

| | | | | |
|---|---|---|---|---|
| 2007/0258191 | A1* | 11/2007 | Higashi | H01G 9/016 361/502 |
| 2015/0069830 | A1* | 3/2015 | Huang | H02H 7/18 307/9.1 |
| 2017/0279284 | A1* | 9/2017 | Lim | H02J 7/0068 |

* cited by examiner

*Primary Examiner* — Rexford N Barnie
*Assistant Examiner* — Xuan Ly
(74) *Attorney, Agent, or Firm* — Blank Rome LLP

(57) ABSTRACT

A power converter may be adapted to provide an output voltage from one of two input voltages. The power converter may include two or more buck converters that share a plurality of power converter components and each converts an individual input voltage to the output voltage. The power converter may include any of a variety of charge equalizing components that may be coupled between input terminals and optional input capacitors, which are coupled between the input terminals and ground. The charge equalizing component(s) provide(s) a fast conduction path for the equalization of input voltages and charge/voltage of the optional input capacitors. The charge equalizing component(s) can mitigate large currents created by differential voltages between the input terminals, which currents would otherwise flow through and potentially damage or destroy the power converter's switching devices.

19 Claims, 5 Drawing Sheets

FAST CHARGE SHARING BETWEEN CAPACITORS OF A DUAL INPUT PATH DC/DC CONVERTER

CROSS REFERENCE TO RELATED APPLICATIONS

This application claims priority under 35 U.S.C. § 119(e) to U.S. Provisional Application Ser. No. 62/443,160, entitled "Fast Charge Sharing Between Capacitors of a Dual Input Path DC/DC Converter", filed on Jan. 6, 2017, the contents of which is herein incorporated by reference.

TECHNICAL FIELD

This disclosure relates generally to the field of power converters and, in particular, to power converters adapted to provide output voltage(s) from two or more input voltages.

BACKGROUND

It is sometimes desirable for electronic devices to have the capability of receiving power from multiple power sources. A cell phone, for example, may be adapted to allow the charging of its battery from a wall adapter, a second battery, a solar charger, or a wireless charger. Such flexibility is helpful to extend the usage of battery-powered electronic devices. When an electronic device receives power from multiple power sources of different voltages, the electronic device may use an internal power converter to convert different input voltages from those power sources to desired output voltage(s).

In practice, the internal power converter may include one or more optional input capacitors at each direct current (DC) input voltage terminal. Those optional input capacitors are typically coupled between individual input terminals and ground, and provide filtering and stabilization (e.g., voltage smoothing) for the corresponding input voltages. When an electronic device receives two or more input voltages of different levels, there may be a differential voltage between the optional input capacitors at those input terminals. Further, if the input capacitors are coupled to each other through semiconductor switching devices without galvanic isolation, the semiconductor switching devices, in presence of their parasitic components, may form a low-impedance conduction path between the input capacitors. The low-impedance conduction path, under the differential voltage, may function as a short circuit and create significant currents flowing through the semiconductor switching devices. The currents may damage or destroy the semiconductor switching devices and impact reliability of the electronic device. Therefore, what is needed is a multi-input power converter that is adapted to mitigate over-currents flowing through its semiconductor switching devices created by optional input capacitors.

SUMMARY

This disclosure describes a power converter adapted to provide output voltage(s) from multiple input voltages. An exemplary dual-input, single-output power converter of an electronic device will be discussed to illustrate the power conversion with multiple inputs and risks associated with over-currents. The exemplary power converter may include two buck converters, both of which may share a plurality of common power converter components, for example, an inductor and a low-side switching device. The power converter may operate one of the two buck converters, based on availability of the corresponding input voltages, to provide a single output voltage to charge a battery and/or power systems of the electronic device. In particular, the power converter may switch a high-side switching device, in coordination with switching of the (shared) low-side switching device, to provide step-down power conversion. The power converter may further comprise an optional input capacitor at each input terminal, which may be coupled between the corresponding input terminal and ground. To mitigate over-currents flowing through its switching devices created by the optional input capacitors, the power converter may use a charge equalizing component coupled between the input terminals and input capacitors. The charge equalizing component provides a fast conduction path for charge sharing and voltage equalization between the optional input capacitors.

In one embodiment, the charge equalizing component may comprise a capacitor, which functions as an alternating current (AC) fast charge sharing path.

In another embodiment, the charge equalizing component may comprise a capacitor and a resistor, which are coupled in parallel. The capacitor may provide an AC fast charge sharing path, while the resistor serves as a bleeding resistor to reduce a residual voltage across the capacitor.

In yet another embodiment, the charge equalizing component may comprise a resistor, which provides a current-limiting, continuous conduction path between the two input capacitors.

In yet another embodiment, the charge equalizing component may comprise series-connected resistor and diode, wherein the charge equalization may take place after the diode is forward biased by a sufficient, positive differential voltage. This may reduce losses on the resistor associated with voltage ripples on the input capacitors.

BRIEF DESCRIPTION OF THE DRAWINGS

Various embodiments of the disclosed concepts are illustrated by way of example and not by way of limitation in the accompanying drawings in which like references indicate similar elements. It should be noted that references to "an", "one" or "another" embodiment in this disclosure are not necessarily to the same or different embodiment, and they mean at least one. In order to be concise, a given figure may be used to illustrate the features of more than one embodiment, or more than one species of the disclosure, and not all elements in the figure may be required for a given embodiment or species.

DETAILED DESCRIPTION

In the following description, for purposes of explanation, numerous specific details are set forth in order to provide a thorough understanding of the disclosed concepts. As part of this description, some of this disclosure's drawings represent structures and devices in block diagram form in order to avoid obscuring the disclosure. In the interest of clarity, not all features of an actual implementation are described in this disclosure. Moreover, the language used in this disclosure has been principally selected for readability and instructional purposes, and may not have been selected to delineate or circumscribe the disclosed subject matter, resort to the claims being necessary to determine such disclosed subject matter.

Figure 1:
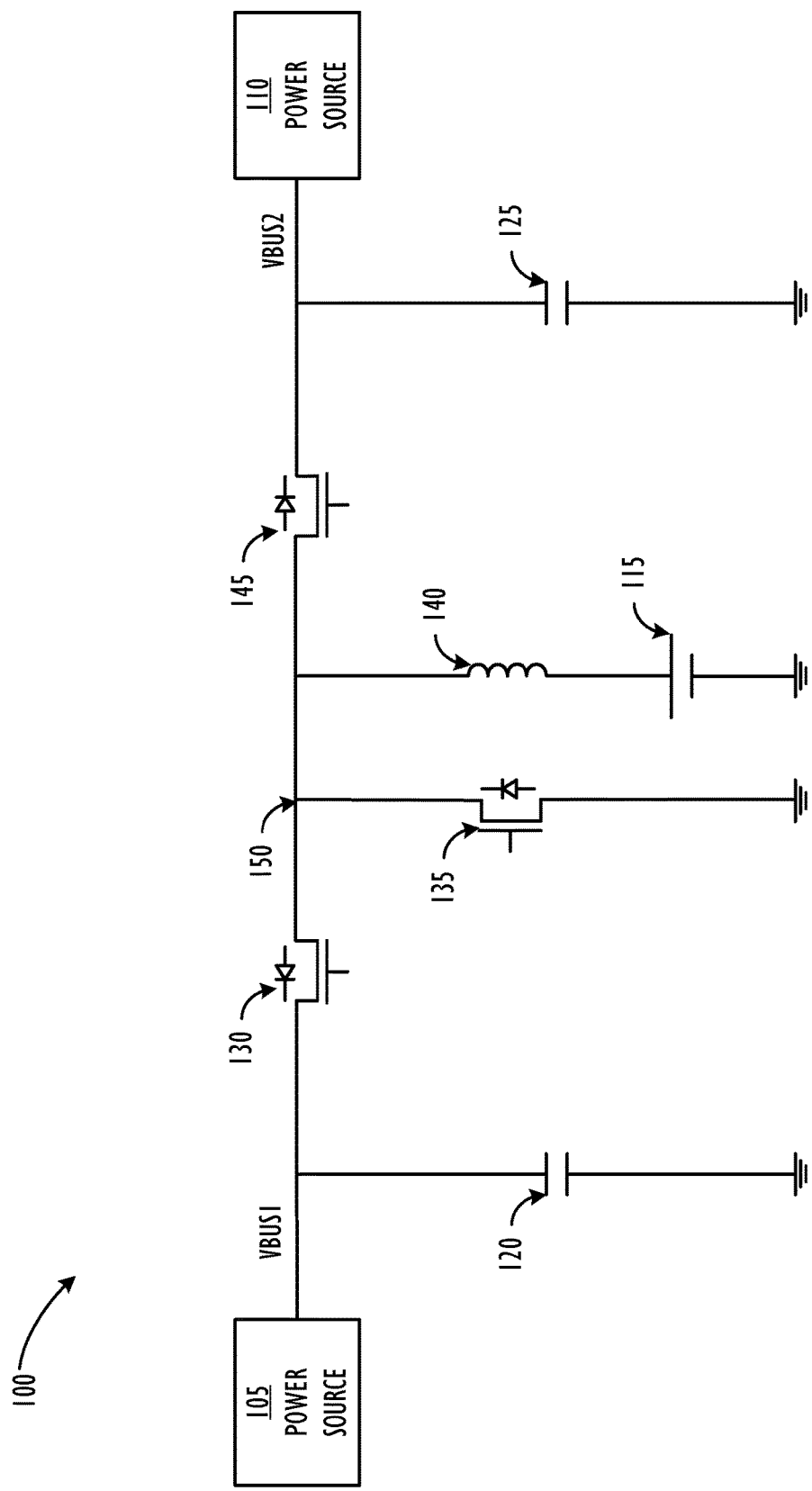
FIG. 1 is the schematic diagram of exemplary dual-input, single-output power converter 100 in accordance with one embodiment.

FIG. 1 is a schematic diagram of exemplary dual-input, single-output power converter 100. As shown in FIG. 1, power converter 100 may receive input voltages from two DC power sources, 105 and 110. Power source 105 may include, for example, a universal serial bus type-C (USB-C) connector that is coupled to a wall adapter or other power sources. Power source 110 may provide power from, for example, a solar charger or an inductive or wireless charger. The input voltages on the two DC voltage buses, VBUS1 and VBUS2, may be different. For example, VBUS1 and VBUS2 may have input voltages of 15V and 5V, respectively. Power converter 100 may further include one or more optional input capacitors for each of the two DC voltage buses, for example, capacitors 120 and 125 as shown in FIG. 1. In particular, capacitor 120 may be coupled between VBUS1 and ground, while capacitor 125 may be placed between VBUS2 and ground. Capacitors 120 and 125 may be ceramic capacitors, and may be used to filter and stabilize the first and second input DC voltages on VBUS1 and VBUS2. In this example, as the first and second input voltages equal to 15V and 5V respectively, there may be a differential voltage of 10V between capacitors 120 and 125.

Power converter 100 may use one of the two power sources 105 and 110 to charge battery 115 and/or power systems of the electronic device, depending on availability of power sources 105 and 110. The battery charging may be implemented through the buck converters. Referring to FIG. 1, the first buck converter may include high-side field-effect transistor (FET) 130, low-side FET 135, and inductor 140. High-side FET 130 and low-side FET 135 may be switched complementarily, for example, by a pulse width modulation (PWM) controller, to step-down the first input voltage of VBUS1 to battery 115's target voltage. Battery 115's target voltage may be regulated by controlling the duty cycles of PWM switching of FETs 130 and 135, which are indicative of ON-durations of the corresponding transistors.

The second buck converter of power converter 100 may comprise high-side FET 145, low-side FET 135, and inductor 140. The second buck converter shares a plurality of common power converter components, such as low-side FET 135 and inductor 140, with the first buck converter. This design feature provides unique advantages to reduce component counts and converter size and improve cost efficiency for the electronic device. Similarly, in the second buck converter, high-side FET 145 may be switched in coordination with (e.g., complementary to) low-side FET 135 to convert the second input voltage of VBUS2 to charge battery 115. Note that FIG. 1 also depicts the body diodes for FETs 130, 135 and 145. Besides FETs, power converter 100 may also use other types of switching devices such as insulated gate bipolar transistors (IGBTs), silicon carbine and/or gallium nitride devices.

Power converter 100 may selectively use the first or the second buck converters to provide power to battery 115 based on the availability of power sources 105 and 110. For example, when power converter 100 receives power from power source 105, e.g., through a USB-C connector, power converter 100 may decide to use the first buck converter to charge battery 115 or power systems (not shown) of the electronic device. Alternatively, when power converter 100 detects that power source 105 becomes unavailable and power source 110 is present, power converter 100 may switch to power source 110, e.g., an inductive or wireless charger. Power converter 100 may use the second buck converter to convert the second input voltage on VBUS2 to the desired output voltage(s). Because the first and second buck converters share the plurality of common power converter components, the two buck converters may share a common switching node, for example, node 150 as shown in FIG. 1. FETs 130 and 145, with their body diodes, may form a low-impedance conduction path between capacitors 120 and 125. For example, when FET 130 is closed, with a positive voltage from VBUS1 to VBUS2, FET 130 and the body diode of FET 145 may provide a low-impedance conduction path from capacitors 120 to 125. Similarly, when FET 145 is closed, with a positive voltage from VBUS2 to VBUS1, FET 145 and the body diode of FET 130 may form a low-impedance conduction path from capacitors 125 to 120.

In this example, it is assumed that power source 105 provides a 15V first input voltage on VBUS1, and power source 110 provides a 5V second input voltage on VBUS2. In practical operations, at the beginning of power conversion, power converter 100 may ramp up the voltage on the associated voltage bus with a slew rate. For example, power converter 100 may increase the first input voltage on VBUS1 to the steady-state (peak) voltage 15V with a slew rate. Accordingly, the voltage of capacitor 125 may increase gradually to 15V. Additionally, as described above, when FET 130 is closed, FET 130 and the body diode of FET 145 form a low-impedance conduction path, allowing the input voltage of VBUS1 to also charge capacitor 125. However, as high-side FET 130 is closed only for a short ON-duration during switching (e.g., indicative by FET 130's PWM duty cycle), the short ON-duration of FET 130 may not provide a sufficient time for the voltage of capacitor 125 to increase with the same rate as that of capacitor 120. In other words, the voltage increase of capacitor 125 may lag that of capacitor 120. As the voltage of capacitor 120 approaches the first input voltage of VBUS1 (e.g., 15V) and the voltage of capacitor 120 increases faster relative to that of capacitor 125, the differential voltage between capacitors 120 and 125 may become larger and larger. In an extreme situation, there may be a 10V (i.e., 15V-5V=10V) or greater voltage differential between capacitors 120 and 125. When FET 130 is closed, the low-impedance conduction path of FET 130 and the body diode of FET 145 may function like a short circuit between capacitors 120 and 125. A significant "short-circuit" current, created by the 10V or greater differential voltage between capacitors 120 and 125, may flow through FET 130 and the body diode of FET 145. The current may exceed design limits of the transistors and damage or destroy these switching devices.

Figure 2:
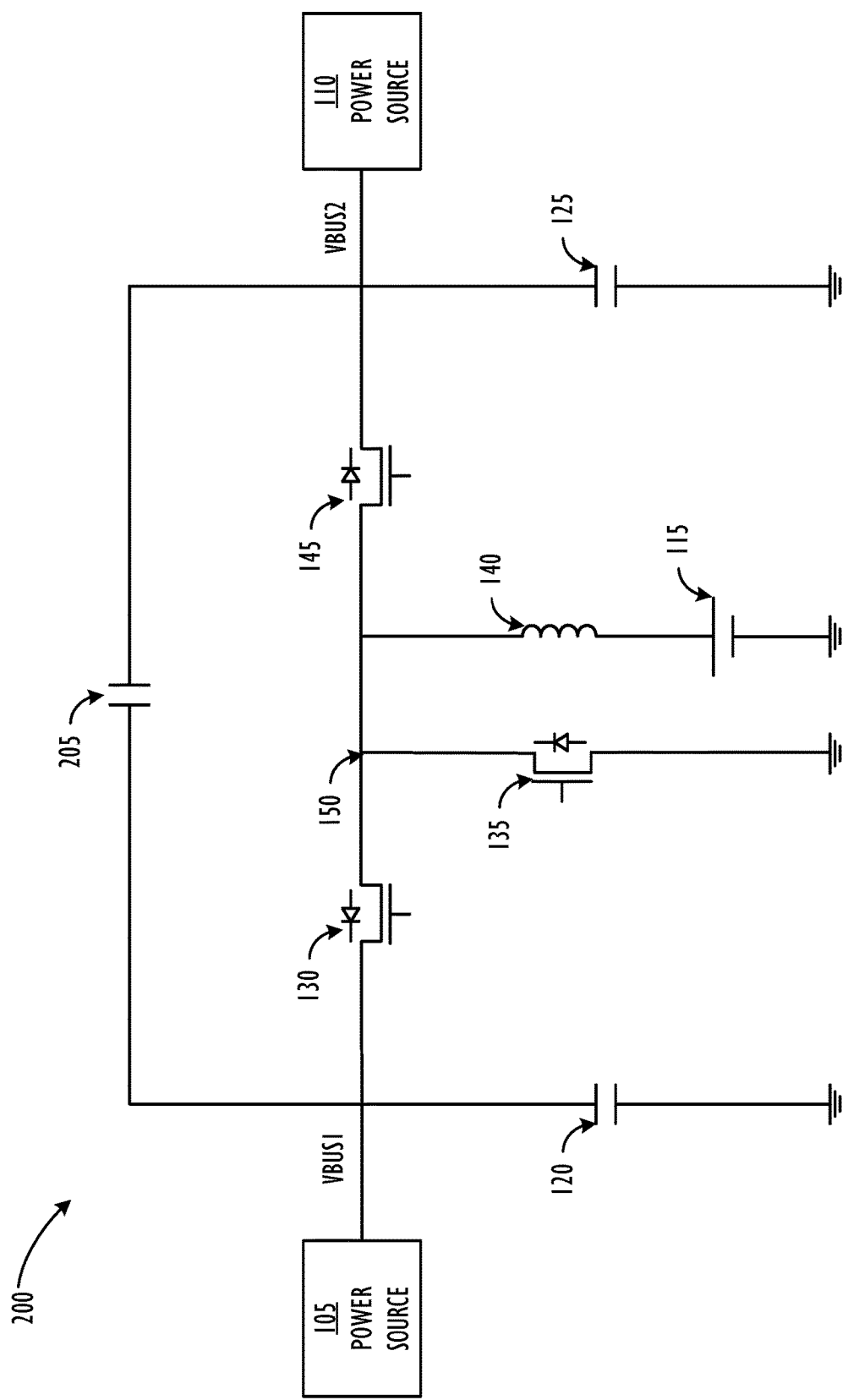
FIG. 2 is the schematic diagram of exemplary dual-input, single-output power converter 200, including a charge equalizing capacitor, in accordance with one embodiment.

One way to address the problem is to use a charge equalizing component to share charge and equalize voltages between capacitors 120 and 125. FIG. 2 illustrates exemplary dual-input, single-output power converter 200, including a charge equalizing capacitor. To simplify explanation, FIG. 2 (and following FIGS. 3-5) will use the same reference signs to indicate similar generic elements that are used throughout the drawings. Referring to FIG. 2, power converter 200 may receive power from two power sources, 105 and 110. Power converter 200 may use either one of the two buck converters to charge battery 115, wherein the first buck converter may comprise high-side FET 130, the second buck converter may comprise high-side FET 145, and the two buck converters may share a plurality of power converter components such as low-side FET 135 and inductor 140.

Power converter 200 may further include capacitor 205, which may be coupled between capacitors 120 and 125. Capacitor 205 may be a ceramic capacitor, whose capacitance may be selected properly to provide a fast alternating current (AC) charge sharing path between capacitors 120 and 125. For example, capacitor 205 may be determined based on the VBUS1 and VBUS2 input voltages, their slew rate, PWM duty cycles and/or switching frequencies of FETs 130, 145 and 135. The goal is to allow the capacitor with a higher voltage (e.g., capacitor 120) to charge the other capacitor with a lower voltage (e.g., capacitor 125) within a minimum amount of duty cycles at the early voltage-ramping stage. Capacitor 205 may behave as a low impedance under AC currents. Therefore, it provides a low-impedance, fast conduction path for capacitors 120 and 125 to share charge. As described in FIG. 1, this facilitates a voltage equalization between capacitors 120 and 125 and reduces an undesired current through the switching devices caused by the differential voltage between the two capacitors. With the fast charge sharing path of capacitor 205, both capacitors 120 and 125 may be effectively coupled to each of the two input voltage buses VBUS1 and VBUS2. Therefore, compared to traditional designs, power converter 200 may use small capacitors, e.g., a less amount of and/or lower impedance ceramic capacitors, to implement capacitors 120 and 125 and still get comparable filtering and voltage smoothing performance. This may be especially critical to battery-powered electronic devices because of their strict volume/sizing requirements.

Figure 3:
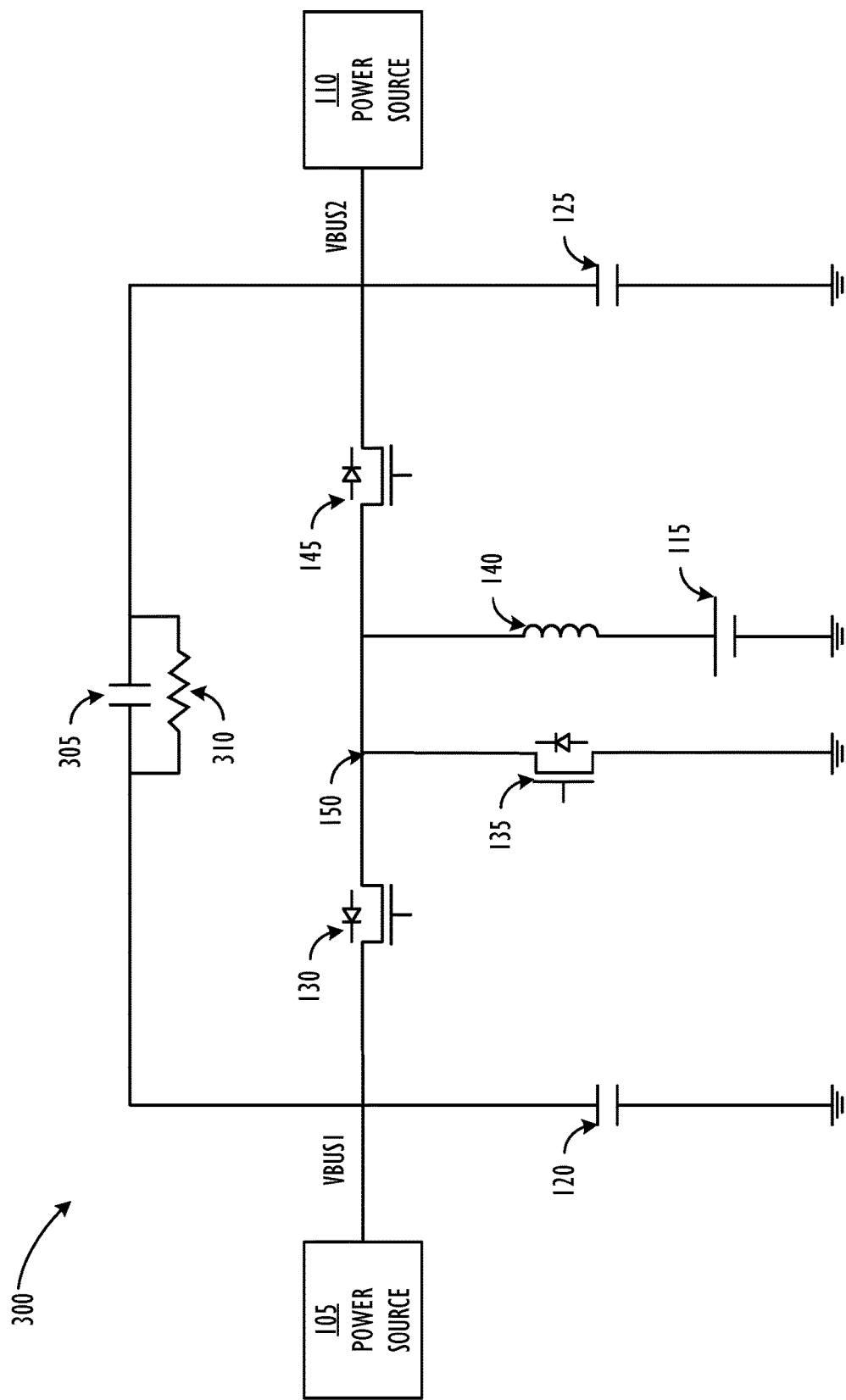
FIG. 3 is the schematic diagram of exemplary dual-input, single-output power converter 300, including a charge equalizing capacitor-resistor circuit, in accordance with one embodiment.

FIG. 3 illustrates exemplary dual-input, single-output power converter 300, including a charge equalizing capacitor-resistor circuit. Power converter 300 is similar to power converter 200 in FIG. 2, except that power converter 300 may include parallel-coupled capacitor 305 and resistor 310 between capacitors 120 and 125. As explained in FIG. 2, capacitor 305 may provide a fast charge sharing path for capacitors 120 and 125, while resistor 310 may serve as a bleeding resistor to drain a residual voltage across capacitor 305. In combination, capacitor 305 may serve as a primary conduction path until the voltages between capacitors 120 and 125 approach equalized, and then, resistor 310 may "kick in" to discharge capacitor 305, preventing capacitor 305 from becoming a charge pump. Ceramic capacitors typically de-rate with voltages. For example, the capacitance of a ceramic capacitor may decrease with an increase of applied DC bias voltages. Therefore, with resistor 310, capacitor 305 may see only a small differential voltage, and capacitor 305 may be implemented by a less amount of and/or lower capacitance ceramic capacitors. Additionally, as described in FIG. 2, capacitors 120 and 125 in FIG. 3 may be effectively coupled to each of the two voltage buses VBUS1 and VBUS2. Therefore, power converter 300 may use small capacitors, e.g., a less amount of and/or lower impedance ceramic capacitors, to implement capacitors 120 and 125. All together, this may greatly reduce the number of capacitors and improve the volume/packaging efficiency for power converter 300.

Figure 4:
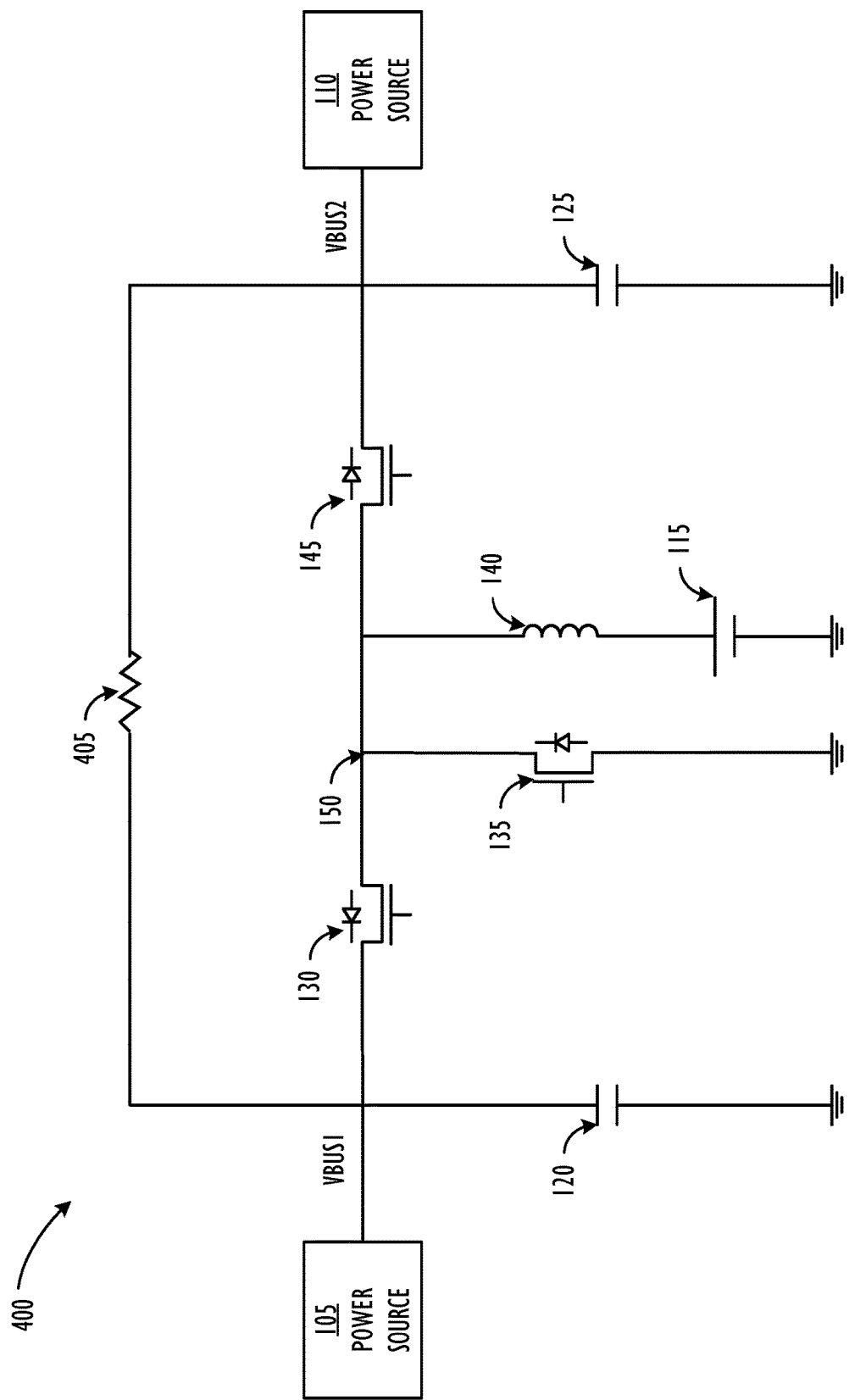
FIG. 4 is the schematic diagram of exemplary dual-input, single-output power converter 400, including a charge equalizing resistor, in accordance with one embodiment.

FIG. 4 illustrates exemplary dual-input, single-output power converter 400, including a charge equalizing resistor. Similar to power converter 100 in FIG. 1, power converter 400 may include two buck converters to convert a first input voltage from power source 105 and a second input voltage from power source 110 to battery 115's target voltage. To mitigate large currents caused by differential voltages between capacitors 120 and 125, power converter 400 may employ resistor 405 to couple capacitors 120 and 125. Resistor 405 may provide a current-limiting, continuous conduction path for the two capacitors to share charge and equalize voltages.

Figure 5:
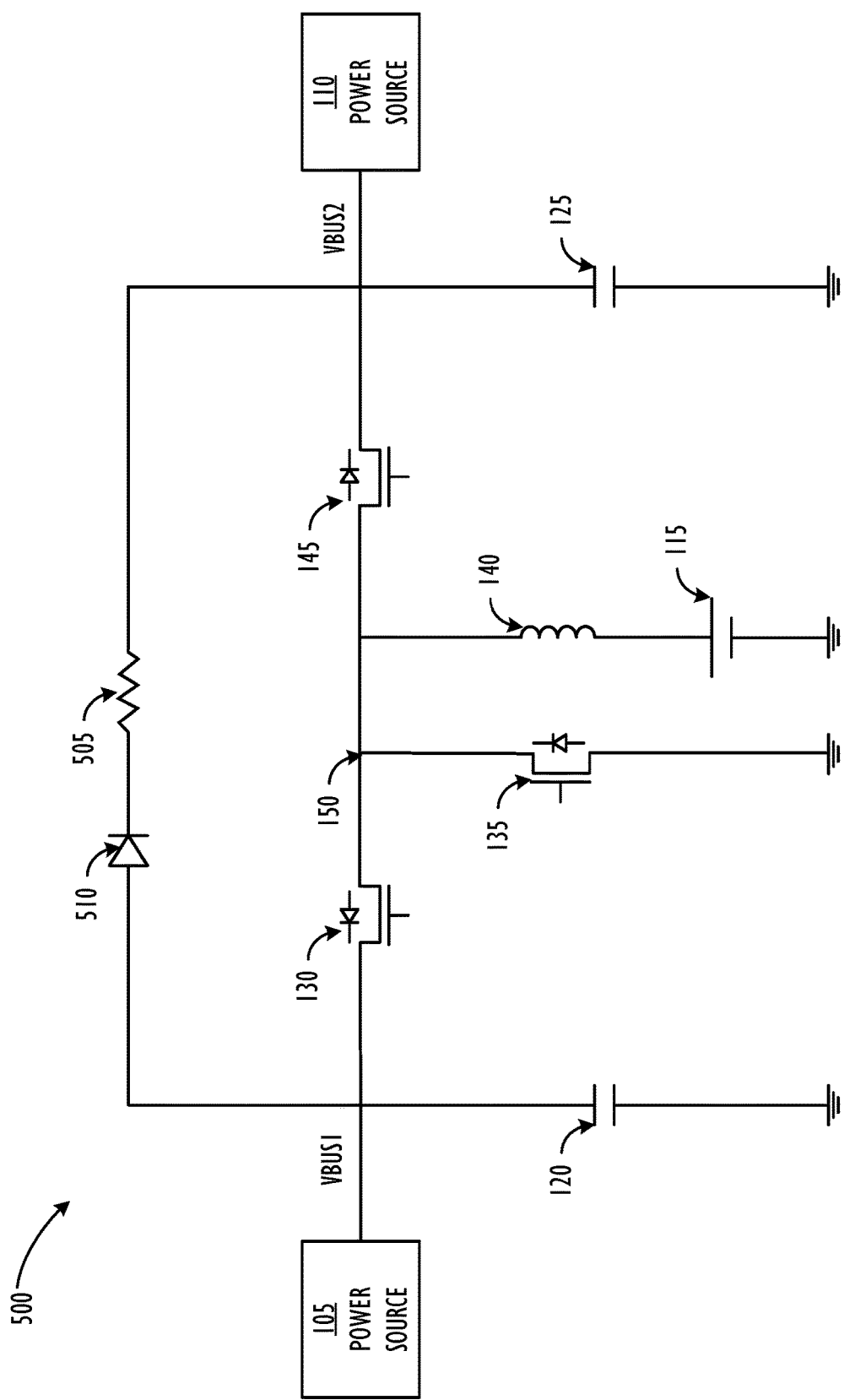
FIG. 5 is the schematic diagram of exemplary dual-input, single-output power converter 500, including a charge equalizing resistor-diode circuit, in accordance with one embodiment.

FIG. 5 shows exemplary dual-input, single-output power converter 500, which represents a revised version of power converter 400 in FIG. 4. By comparison, besides resistor 505, power converter 500 may further include diode 510 that is connected in series with resistor 505. Diode 510 may block a reverse current flowing, for example, from capacitor 125 to capacitor 120. Additionally, because diode 510 conducts only after it is forward biased by a sufficient positive voltage, diode 510 may prevent resistor 505 from conducting all the time especially under influence of voltage ripples on capacitors 120 and 125. In other words, when the differential voltage between capacitors 120 and 125 is too small, currents caused by this differential voltage may not pose a true risk to FETS 130 and 145, and therefore charge sharing and voltage equalization between capacitors 120 and 125 may not be needed. Such a "selective" conduction may help to eliminate unnecessary conduction losses. Note that diode 510 may be placed in an opposite polarity depending on input voltage levels of VBUS1 and VBUS2. Further, diode 510 may be replaced by other types of switching device, such as FETs, IGBTs, silicon carbine and/or gallium nitride devices, and so on. For example, power converter 500 may replace diode 510 with FET 510. Power converter 500 may monitor and compare the differential voltage between capacitors 120 (of VBUS1) and 125 (of VBUS2) with a threshold voltage. When the differential voltage exceeds the threshold, power converter 500 may close FET 510 to allow charge sharing between capacitors 120 and 125.

The various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power circuit adapted to provide an output voltage from one of a first input voltage and a second input voltage, comprising:
    a first terminal configured to receive the first input voltage;
    a second terminal configured to receive the second input voltage;
    an output terminal configured to provide an output voltage;
    a first switching device coupled to the first terminal and configured to act in conjunction with a plurality of common power converter components operatively coupled between the first switching device and the output terminal and including an inductor and a low side switching device to step-down the first input voltage to the output voltage;
    a second switching device coupled to the second terminal and configured to act in conjunction with the plurality of common power converter components operatively coupled between the second switching device and the output terminal to step-down the second input voltage to the output voltage; and one or more charge equalizing components coupled between the first and second terminals configured to equalize voltages between the first and second terminals when the power circuit switches from the first input voltage to the second input voltage.

2. The power circuit of claim 1, wherein a first capacitor is coupled between the first input terminal and ground;

a second capacitor is coupled between the second input terminal and ground; and equalizing voltage between the first and second terminals comprises equalizing voltages between the first and second capacitors that are coupled to the respective first and second terminals.

3. The power circuit of claim 1, wherein the one or more charge equalizing components comprise a capacitor.

4. The power circuit of claim 3, wherein the one or more charge equalizing components further comprise a resistor coupled in parallel with the capacitor.

5. The power circuit of claim 1, wherein the one or more charge equalizing components comprise a resistor.

6. The power circuit of claim 5, wherein the one or more charge equalizing components further comprise a diode coupled in series with the resistor.

7. The power circuit of claim 1, wherein the one or more charge equalizing components comprise one or more switching devices.

8. The power circuit of claim 7, wherein the one or more charge equalizing components comprises the one or more switching devices coupled in series with a resistor, and wherein the one or more switching devices are controlled based on a differential voltage between the first and second terminals.

9. The power circuit of claim 1, wherein the plurality of common power converter components comprise an inductor and a switching device; and the plurality of common power converter components are configured to operate with at least one of the first and second switching devices to form a buck converter.

10. A method for providing an output voltage from one of a first input voltage and a second input voltage, comprising:

obtaining the first input voltage from a first terminal;

obtaining the second input voltage from a second terminal;

using a first switching device coupled to the first terminal in conjunction with a plurality of common power converter components operatively coupled between the first switching device and the output terminal and including an inductor and a low-side switching device to step-down the first input voltage to an output voltage of an output terminal;

using a second switching device coupled to the second terminal in conjunction with the plurality of common power converter components operatively coupled between the second switching device and the output terminal to step-down the second input voltage to the output voltage of the output terminal; and using one or more charge equalizing components to equalize voltages between the first and second terminals when switching from the first input voltage to the second input voltage.

11. The method of claim 10, wherein a first capacitor is coupled between the first input terminal and ground;

a second capacitor is coupled between the second input terminal and ground; and equalizing voltage between the first and second terminals comprises equalizing voltages between the first and second capacitors that are coupled to the respective first and second terminals.

12. The method of claim 10, wherein the one or more charge equalizing components comprise a capacitor.

13. The method of claim 12, wherein the one or more charge equalizing components further comprise a resistor coupled in parallel with the capacitor.

14. The method of claim 10, wherein the one or more charge equalizing components comprise a resistor.

15. The method of claim 14, wherein the one or more charge equalizing components further comprise a diode coupled in series with the resistor.

16. The method of claim 10, wherein the one or more charge equalizing components comprise one or more switching devices coupled in series with a resistor, and wherein equalizing voltages between the first and second terminals comprises controlling the one or more switching devices based on a differential voltage between the first and second terminals.

17. The method of claim 10, further comprises using the output voltage to charge a battery.

18. A power circuit adapted to provide an output voltage from one of a first input voltage and a second input voltage, comprising:

a first terminal configured to receive the first input voltage, the first terminal coupled to a first capacitor;

a second terminal configured to receive the second input voltage, the second terminal coupled to a second capacitor;

an output terminal configured to provide an output voltage;

a first switching device coupled to the first capacitor and configured to act in conjunction with a plurality of common power converter components operatively coupled between the first switching device and the output terminal and including an inductor and a low side switching device to step-down the first input voltage to the output voltage;

a second switching device coupled to the second capacitor and configured to act in conjunction with the plurality of common power converter components to step-down the second input voltage to the output voltage; and one or more charge equalizing components coupled between the first and second capacitors and configured to reduce a differential voltage between the first and second capacitors.

19. The power circuit of claim 18, wherein the one or more charge equalizing components further comprise a resistor coupled in parallel with the capacitor.

* * * * *